Oct. 25, 1966 F. F. GRANT 3,281,040

TAPE GUIDE

Filed Nov. 27, 1964 2 Sheets-Sheet 1

INVENTOR.
FREDERIC F. GRANT

BY

Christie, Parker & Hale
ATTORNEYS.

INVENTOR.
FREDERIC F. GRANT
BY
Christie, Parker & Hale
ATTORNEYS.

3,281,040

TAPE GUIDE

Frederic F. Grant, Bellflower, Calif., assignor to Consolidated Electrodynamics Corporation, Pasadena, Calif., a corporation of California Filed Nov. 27, 1964, Ser. No. 414,316
6 Claims. (Cl. 226—97)

This invention relates to apparatus for guiding a moving magnetic tape in a tape transport, and more, particularly, to a novel arrangement for guiding the tape so that one edge of the tape maintains a predetermined position relative to the tape transport structure.

Since information stored on magnetic tapes is recorded on parallel tracks along the length of the tape, it is necessary that the means for guiding the magnetic tape under a magnetic head to read the information stored therein prohibit lateral movement of the tape relative to the magnetic head. In particular, if lateral movement or skewing of a magnetic tape relative to the read head is allowed, bits of information may be missed in the reading of the tape, thereby resulting in errors in the functioning of the circuitry which is dependent for accurate operation upon information stored on the tape.

In the past, two basic means have been utilized to provide guiding of a moving magnetic tape. The first means employs a tape support having two fixed shoulder guides disposed on opposite sides of the tape. The fixed shoulders are dimensioned to accommodate the maximum width tape, plus a small safety factor. This arrangement provides satisfactory operation for the maximum tape width. However, when a tape of a lesser width is being read, such a tape guide arrangement does not provide close tolerance support for the edges of the tape. Thus the tape may run through the guides at an angle relative to the read head and thereby allowing bits of information to be lost. A most common example of this type of tape guiding means is a rotatable tape guide spool.

The second class of tape guide means employs one or more spring loaded guide shoulders. These shoulders press against the opposite edges of the tape to maintain alignment of the tape as it passes under the read head. Due to the pressure of the guides against the edges of the tape, the tape edge is caused to wear. After a number of readings, this wear results in misalignment with the tape tracks with read heads. Further, this arrangement produces lateral forces in the tape which, for light weight tapes, may result in buckling of the tapes unless the spring loading pressure is accurately adjusted. Still further, due to the wearing of the edges of the magnetic tape, metallic oxide powder is formed which may interfere with the detection of the bits of information by the read head, as well as cause misalignment of the tape by seating of the powder under and along the edges of the tape as it is guided onto the read head.

The spring loaded tape guide arrangement possesses a further limitation in that, due to the inertia of the springs, they are unable to react to small irregularities in the edge of the magnetic tape as it rapidly passes under the read head. Accordingly, the tape oscillates laterally of its principal lengthwise direction of the motion.

In view of the above, the present invention provides a novel tape guiding arrangement which maintains the edge of a magnetic tape against a fixed guide support regardless of the irregularities in the edge of the tape. This is done without exerting undue forces on the edge of the tape. Additionally, this invention provides an edge-oriented tape guiding apparatus which smooths out deviations from true linearity in the guided edge of the tape so that lateral oscillation of the tape relative to its principal direction of movement is minimized.

Generally speaking, this invention provides apparatus for guiding a thin flexible strip of material. The apparatus includes a guide member which has a surface with which a surface of the strip is juxtaposed. Means are provided which define a pair of spaced parallel shoulders which extend along the surface of the guide member. The strip is disposed between the shoulders. Means are also provided for directing a fluid stream to a position between the guide surface and the surface of the strip to support the strip relative to the surface of the guide member. The apparatus further includes means which cooperate with the fluid stream for defining a fluid pressure gradient transversely of the strip between the strip and the guide member.

The above and other features of this invention are more fully set forth in the following detailed description of preferred embodiments of the invention taken in conjunction with the accompanying drawings wherein.

Figure 1:
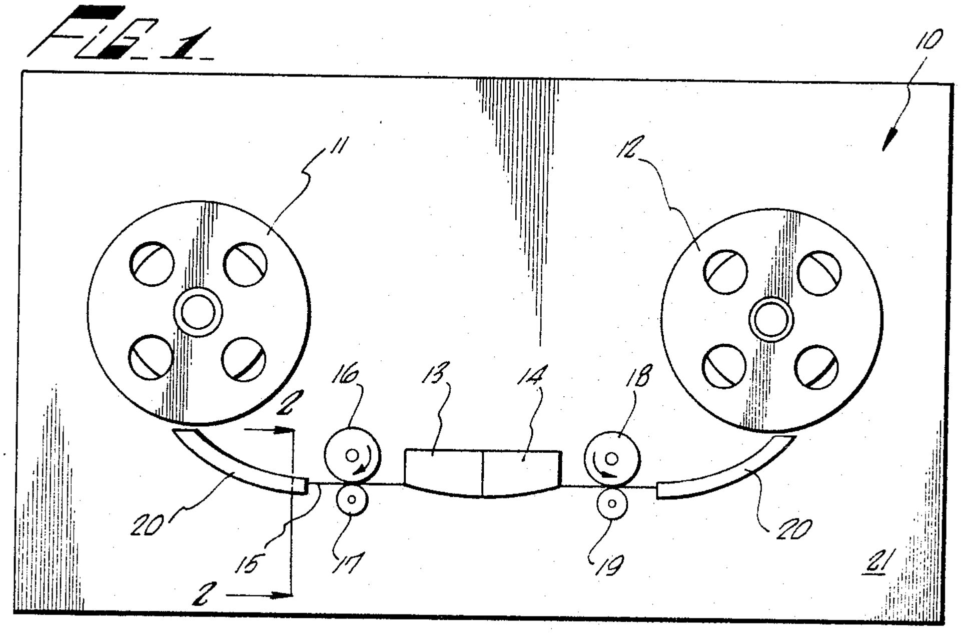
FIG. 1 is an elevation view of a tape transport equipped with tape guides according to this invention.

FIG. 1 shows a tape transport 10 which includes a tape storage reel 11 and a take-up reel 12 which are rotatably driven by means well known in the art. The transport also includes a read head 13 and a write head 14. A filament of magnetic recording tape 15 is fed past the magnetic heads from reel 11 to take-up reel 12. In order that the tape may be moved from left to right as shown in FIG. 1, the tape just upstream of read head 13 is passed between a counter-clockwise rotating capstan 16 and a pinch roller 17. A clockwise rotating capstan 18 and a second pinch roller 19 are disposed adjacent write head 14 for moving the tape in the opposite direction.

A pair of tape guides 20 are mounted on tape transport deck 21. Each tape guide extends from adjacent one of capstans 16 or 18 to adjacent the periphery of the nearest tape reel. Each guide is curved in a plane parallel to transport deck 21 and is disposed on the deck so that the guide receives tape tangentially from the adjacent reel regardless of the degree of fullness of the reel and feeds the tape tangentially from its opposite end to the adjacent capstan.

Figure 2:
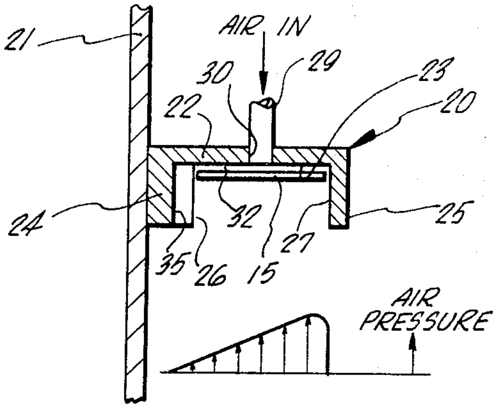
FIG. 2 is an enlarged cross-sectional elevation view taken along line 2—2 of FIG. 1.

The cross-sectional elevation view of FIG. 2 is taken in a plane normal to the plane of tape deck 21. In cross-section, guide 20 has a generally U-shaped configuration with the legs of the U lying parallel to deck 21 and extending in the direction in which the tape guide is convexly curved. Each guide has a base 22 extending between the legs of the U. The base has a planar bearing surface 23 adjacent which tape 15 is disposed. A pair of spaced shoulders 24 and 25 extend from the base along the length of and on opposite sides of surface 23 and define the legs of U-shaped configuration of the guide. Shoulder 24 is abutted against the surface of tape transport deck 21. The shoulders define opposing parallel plane surfaces 26 and 27, respectively, which are spaced apart a distance slightly greater than the width of tape 15. A plurality of air ducts 29 are connected to the side of base 22 opposite from surface 23 at regularly spaced apart locations along the guide. Each duct is adapted to be connected to a source of compressed air (air having a pressure greater than the ambient pressure) at a location remote from the guide. Each duct communicates with guide surface 23 through a corresponding aperture 30.

As tape transport 10 is operated, air is supplied under pressure through ducts 29 to a space 32 between guide member surface 23 and tape 15. Since the edges of the tape are closely spaced adjacent shoulder surfaces 26 and 27, the pressure of the air in space 32 is at a pressure greater than ambient pressure. Accordingly, the tape is supported relative to the guide by this air cushion, and the tape moves through the guide in a substantially friction-free manner.

To assure that information tracks of the tape are aligned with the proper gaps of read head 13, it is desired that the edge of the tape be guided in a predetermined manner relative to the surface of tape transport deck 21. In the apparatus shown in FIG. 2, it has been assumed that the edge of the tape disposed closest to deck 21 is to be maintained a predetermined distance from the surface of the deck. Accordingly, shoulder 24 has a thickness (the dimension in the direction parallel to guide member surface 23) equal to this predetermined distance.

A plurality of recesses 35 are formed in shoulder 24 at regularly spaced intervals along the length of the guide. The recesses extend from surface 23 away from guide member base 22 and open toward shoulder surface 27. The air introduced into space 32 tends to escape from the space primarily through recesses 35. The pressure exerted on the tape by the air in space 32 adjacent shoulder 24 is less than the pressure exerted on the tape by the air in the space adjacent shoulder 25. Accordingly, a positive pressure gradient exists in the space by virtue of the cooperation of the recesses with the air stream flowing from ducts 29. The gradient varies transversely of the tape and has a profile 36 (see FIG. 2) which increases from a minimum adjacent shoulder 24 to a maximum adjacent shoulder 25. The tape thus tends to slide "downhill" of the gradient and the edge of tape 15 adjacent surface 26 of shoulder 24 is brought into contact with shoulder 26. The tape is, therefore, edge-guided along surface 26. The forces which cause the tape to move into engagement with shoulder 24 are low, however, so that the tape is not caused to wear excessively as it rides along shoulder 24. Accordingly, metallic oxides are not abraded from the tape and the read and write heads are not fouled. It will be understood that only contact between the tape and the guide member is between the edge of the tape and shoulder surface 26 since the tape is otherwise supported from the guide member by the air introduced through ducts 29.

It is preferred that each air vent recess 35 be located adjacent the midpoint of the distance between adjacent air ducts 29. Such a relationship assures that there is sufficient air pressure in space 32 so that tape 15 does not ride against surface 23 between the air ducts.

Magnetic recording tape, as manufactured, is not always perfectly straight along its elongate extent, although it usually is of constant width. Such tape has a characteristic snakiness. Many edge-oriented tape guiding devices are insensitive to this snakiness and tape passing through such devices tends to oscillate laterally of the direction of tape movement through a tape transport. Such oscillation causes undesirable variations in the performance of the transport during recording and reproducing processes.

Figure 3:
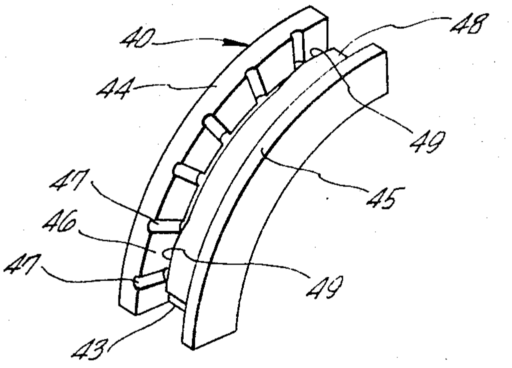
FIG. 3 is a top plan view of a second embodiment of this invention.

FIG. 3 shows a tape guide 40 which minimizes the lateral oscillation of a tape due to tape snakiness even though guide 40 edge-guides the tape. Guide 40 in cross-section is substantially identical to guide 20 shown in FIG. 2. Guide 40 is curved in a plane perpendicular to the transverse extent of the tape. The tape moves in the plane of guide curvature. In accord with the above description of this invention, guide 40 has a base portion 43 and spaced apart parallel shoulders 44 and 45. Surface 46 of shoulder 44 which opens toward shoulder 45 defines a plurality of recesses 47 therein at regularly spaced intervals the length of the guide. A magnetic recording tape 48 is engaged in guide 40 and is snakey in that the edges of the tape (ignoring the curvature imposed upon the tape by guide 40) are not perfectly straight. The nonlinearity of the tape has nodes 49 at substantially regular intervals along the tape. (The non-linearity of the tape is exaggerated in FIG. 3 for the purposes of illustrating the invention.) Guide 40, however, has an elongate extent which is at least as great as the distance along the tape between the node points of tape edge non-linearity. Accordingly, at least one node point 49 is always engaged in guide 40 to maintain the mean centerline of tape 48 in a predetermined position relative to edge-guiding surface 46. The tape, therefore, does not oscillate unduly transversely of the tape guide. Guide 40 is shown as arcuately curved to illustrate the versatility of this invention. A straight guide wherein base 43 of the guide is planar also is within the scope of this invention.

In the device illustrated in FIG. 3, the guide has a radius of curvature in the plane of the tape of approximately 2 feet, assuming that tape 48 has a width of 2 inches.

Figure 4:
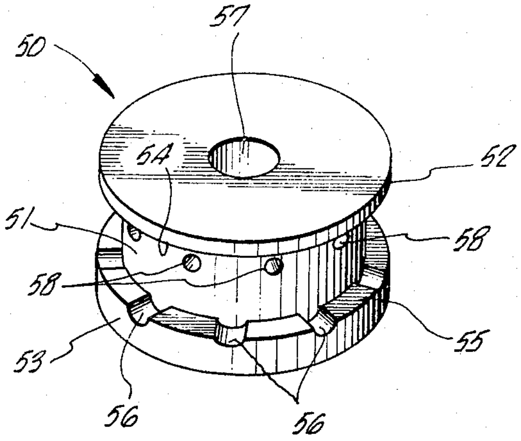
FIG. 4 is a perspective view of another embodiment of this invention.

FIG. 4 shows a tape guide 50 fabricated in the form of a drum having a circularly cylindrical air-bearing surface 51. Circumferential shoulders 52 and 53 extend radially of the drum outwardly of surface 51 and have radial parallel surfaces 54 and 55, respectively, which are spaced apart a distance slightly greater than the width of the tape to be handled by the guide member. (The clearance between surfaces 54 and 55 is sufficient to accommodate any snakiness in the tape.) A plurality of grooves 56 are formed in shoulder surface 55 and extend radially along the shoulder from surface 51 to the outer diameter of the shoulder. An axial bore 57 is formed in the guide drum. Lateral ducts 58 communicate from surface 51 to bore 57. Openings of lateral ducts 58 to surface 51 preferably are midway between surfaces 54 and 55 and are midway between adjacent grooves 56 proceeding circumferentially of the drum.

Figure 5:
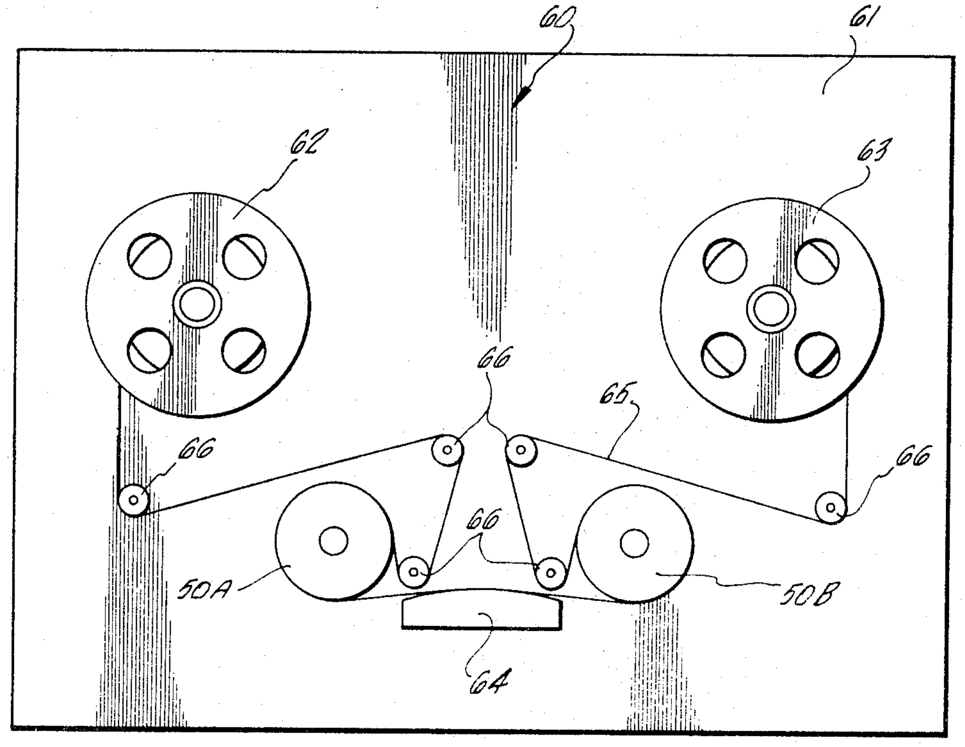
FIG. 5 is an elevation view of a tape transport equipped with tape guides of the type shown in FIG. 4.

FIG. 5 shows a tape transport 60 having a tape deck 61 to which are mounted a pair of rotatable tape reels 62 and 63. A magnetic head assembly 64 is disposed centrally of the tape deck between the reels. A length of magnetic recording tape 65 is threaded from reel 62 around a first cylindrical guide 50A (fabricated in accord with the above description pertinent to FIG. 4) over head assembly 64 around a second guide 50B to reel 63. Bores 57 of guides 50A and 50B are plugged at the ends of the guides opposite from tape deck 61. Air is supplied to the bores through the tape deck. The tape is passed around a major portion of the circumference of each of guides 50A and 50B. Assuming that the distance between the node points of tape edge non-linearity is 18 inches, each of drums 50A and 50B is engaged by the tape around at least 18 inches of the circumference of the drum. Since it is not practical to engage the tape with the entire circumference of the drum, it is preferred that drums 50A and 50B have a radius of 4 inches at surfaces 51. As a general rule, however, the radius of the drum should be large enough to result in more than one node point in contact with the guiding edge of the guide. The radius may be more or less than 4 inches depending upon the extent the tape is wrapped around the drum. As shown in FIG. 5, tape 65 is guided to drums 50A and 50B by a plurality of conventional idler spools 66 suitably arranged on tape deck 61.

There has been described above a tape guiding mechanism which gently handles the guided tape. Tapes guided in devices according to this invention are not abraded and, therefore, magnetic oxides are not released from the tape to impair the operation of the guides and of recording and reproducing heads. Moreover, tape guides according to this invention can be rendered insensitive to tape snakiness to assure uniform motion of the tape relative during recording and reproducing processes.

Where guides according to this invention are curved in either of the manners described above, it is recommended that the pressure of the air supplied to the space between the tape and the guide be higher than in situations where the tape guide is straight. In both cases, the tape path in the guide should be curved, not planar, to impart lateral stiffness to the tape. The pressure of the air supplied to the guide is proportional to tape tension and inversely proportional to the radius of curvature of the tape path in the guide.

While the invention has been described above in conjunction with specific apparatus, this has been by way of example and is not to be considered as limiting the scope of this invention.

What is claimed is:

1. Apparatus for edge guiding a thin flexible strip of material comprising a guide member having a surface with which a surface of the strip is juxtaposed, means providing a pair of spaced parallel shoulders extending along the surface of the guide member and between which the strip is disposed, means for directing a fluid stream through the guide member to support the strip relative to the surface of the guide member, and means cooperating with the fluid stream for defining a fluid pressure gradient transversely of the strip between the strip and the guide member so that the strip moves toward the low pressure end of the gradient and the corresponding edge of the strip engages the adjacent shoulder.

2. Apparatus for edge guiding a thin flexible strip of material comprising a guide member having a surface with which a surface of the strip is juxtaposed, means providing a pair of spaced parallel shoulders extending along the surface of the guide member and between which the strip is disposed, means for flowing air at a pressure greater than ambient pressure through the guide member to support the strip from the surface of the guide member, and means for defining between the guide member and the strip an air pressure gradient which has a value adjacent one edge of the strip greater than adjacent the other edge of the strip thereby to induce the strip to move so that the other edge of the strip engages the adjacent shoulder.

3. Apparatus for edge guiding magnetic recording tape comprising a guide member having a surface with which a surface of the strip is juxtaposed and a length at least as great as the distance between peaks of tape edge irregularity, means providing a pair of spaced parallel shoulders extending along the surface of the guide member proximate to the edges of the tape, means for flowing air at a pressure greater than ambient pressure through the guide member to support the tape from the surface of the guide member, and means for defining between the guide member and the tape an air pressure gradient which has a value adjacent one edge of the tape greater than adjacent the other edge of the tape thereby to induce the tape into engagement with the shoulder adjacent said other tape edge.

4. Apparatus for guiding a thin flexible strip of material comprising a guide member defining a surface over which the strip is passed and a pair of spaced parallel shoulders extending along the surface of the guide member, one shoulder defining therealong at substantially regular intervals a plurality of recesses extending from the surface of the guide member and opening toward the other shoulder, and means for directing a fluid stream through the guide member against the strip to support the strip relative to the guide member, the fluid passed through the guide member escaping from between the guide member and the strip primarily through the recesses thereby to define between the strip and the guide member, when the strip is present adjacent the guide member surface, a fluid pressure gradient which has a greater value adjacent the other shoulder than adjacent the one shoulder.

5. Apparatus for edge guiding magnetic recording tape comprising a guide member defining a surface over which the tape is passed, the surface having a length at least as great as the distance between peaks of tape edge irregularity, means providing a pair of spaced parallel shoulders extending along the surface of the guide member, one shoulder defining therealong at substantially regular intervals a plurality of recesses extending from the surface of the guide member and opening toward the other shoulder, and means for directing a fluid stream through the guide member against the tape to support the tape relative to the guide member, the fluid passed through the guide member escaping from between the guide member and the tape primarily through the recesses thereby to define between the tape and the guide member, when the tape is present between adjacent the guide member surface, a fluid pressure gradient which has a greater value adjacent the other shoulder than adjacent the one shoulder, the gradient inducing the tape into engagement with the one shoulder at the adjacent edge of the tape.

6. Apparatus according to claim 5 wherein the guide member is a drum defining the surface and the shoulders around its circumference.

References Cited by the Examiner

UNITED STATES PATENTS

| | | | |
|---|---|---|---|
| 2,916,228 | 12/1959 | Wellington | 242—76 |
| 3,087,664 | 4/1963 | Streeter | 226—97 |
| 3,186,326 | 6/1965 | Schmidt | 226—97 X |
| 3,187,971 | 6/1965 | Miller | 242—55.12 X |

M. HENSON WOOD, Jr., *Primary Examiner.*

ROBERT B. REEVES, *Examiner.*

J. N. ERLICH, *Assistant Examiner.*